United States Patent
Smith

(10) Patent No.: US 6,468,400 B2
(45) Date of Patent: Oct. 22, 2002

(54) METHOD FOR OPTIMIZING OZONE PRODUCTION IN A CORONA DISCHARGE OZONE GENERATOR

(76) Inventor: Durand M. Smith, 101 Camino Harranes, Placitas, NM (US) 87043

(*) Notice: Subject to any disclaimer, the term of this patent is extended or adjusted under 35 U.S.C. 154(b) by 0 days.

(21) Appl. No.: 09/759,142

(22) Filed: Jan. 12, 2001

(65) Prior Publication Data

US 2002/0058000 A1 May 16, 2002

Related U.S. Application Data

(60) Provisional application No. 60/176,334, filed on Jan. 14, 2000, and provisional application No. 60/178,194, filed on Jan. 26, 2000.

(51) Int. Cl.[7] .................................................. B01J 19/08
(52) U.S. Cl. .................................... 204/176; 422/186.07
(58) Field of Search ....................... 204/176; 422/186.07

(56) References Cited

U.S. PATENT DOCUMENTS

| | | | |
|---|---|---|---|
| 1,096,991 A | 5/1914 | Blanchard | |
| 3,836,786 A | 9/1974 | Lowther | |
| 3,891,561 A | 6/1975 | Lowther | |
| 3,899,683 A | 8/1975 | Lowther | |
| 3,903,426 A | 9/1975 | Lowther | |
| 3,954,586 A | 5/1976 | Lowther | |
| 3,984,697 A | 10/1976 | Lowther | |
| 3,996,474 A | 12/1976 | Lowther | |
| 4,013,567 A | 3/1977 | Emelyanov et al. | |
| 4,141,686 A | 2/1979 | Lewis | |
| 4,255,663 A | 3/1981 | Lewis | |
| 4,411,756 A | 10/1983 | Bennett et al. | |
| 4,504,446 A | 3/1985 | Kunicki et al. | |
| 4,780,277 A | 10/1988 | Tanaka et al. | |
| 4,917,586 A | 4/1990 | Jacob | |
| 4,954,321 A | 9/1990 | Jensen | |
| 5,004,587 A | 4/1991 | Tacchi | |
| 5,089,098 A | 2/1992 | Tacchi | |
| 5,145,350 A | 9/1992 | Dawson et al. | |
| 5,154,895 A | 10/1992 | Moon | |
| 5,211,919 A | 5/1993 | Conrad | |
| 5,302,343 A | 4/1994 | Jacob | |
| 5,306,471 A | 4/1994 | Harbert et al. | |
| 5,433,927 A | 7/1995 | Mausgrover et al. | |
| 5,770,168 A | * | 6/1998 | Carlsten et al. ........ 422/186.07 |

* cited by examiner

Primary Examiner—Kishor Mayekar
(74) Attorney, Agent, or Firm—TraskBritt

(57) ABSTRACT

A method for optimizing a concentration of ozone produced by a corona discharge ozone generator. The method includes applying a DC voltage to a primary winding of a transformer of the ozone generator at a driving frequency of about half the resonant frequency of a tank circuit of the ozone generator. The DC voltage may also be applied to and withdrawn from the primary winding at a duty cycle of about 50%. When a desired driving frequency is selected, the method includes selecting a corona cell having a capacitance that, along with the secondary inductance of the transformer of the ozone generator, produces a resonant frequency of about twice the selected driving frequency. Ozone generators and improved ozone generators that are configured to produce ozone in accordance with the disclosed methods are also disclosed.

19 Claims, 1 Drawing Sheet

METHOD FOR OPTIMIZING OZONE PRODUCTION IN A CORONA DISCHARGE OZONE GENERATOR

PRIORITY CLAIM

Under the provisions of 35 U.S.C. § 119(e), priority is claimed from U.S. Provisional Application Ser. No. 60/176,334, filed on Jan. 14, 2000, and from U.S. Provisional Application Ser. No. 60/178,194, filed on Jan. 26, 2000.

TECHNICAL FIELD

The invention relates generally to processes for generating ozone. More specifically, this invention relates to a method for optimizing the amount of ozone that can be generated with a corona discharge ozone generator.

BACKGROUND

Ozone is an unstable triatomic allotrope of oxygen. It is produced in an energized environment wherein molecular oxygen dissociates into monatomic oxygen, which subsequently collides and recombines with an oxygen molecule to form a highly reactive ozone molecule.

Although ozone is primarily employed in disinfection, it can perform other functions such as color reduction, odor and taste removal, algae control, oxidation of inorganic and organic compounds in water and waste-water treatment practices, waste gas treatment and bleaching of paper pulp.

The most prominent features of ozone as a biocide lie in its speed and selectivity in oxidation. Biocidal effects are believed to be primarily achieved through oxidation. Consistent with this belief, the ability of any chemical to reduce microbial viability is in direct proportion to its oxidation potential. Ozone is the fourth most powerful oxidizing agent known; only fluorine, fluorine dioxide, and monatomic oxygen are thought to be more reactive. Ozone possesses an oxidation potential of 2.07 millivolts relative to an oxidation potential of 1.36 millivolts for chlorine gas. It is important to note that an increased oxidation potential is indicative of an accelerated bacterial kill. The rate of disinfection has been demonstrated to be more than 3,000 times faster than chlorine; thus, contact time is a lesser consideration in the application of ozone as a microbicide.

Disinfection with the use of ozone may proceed by oxidation directly and by intermediate hydroperoxy compounds that can interact with cytosolic components. Organic ozone chemistry would predict that oxidized organic compounds containing carbon-carbon double bonds give rise to hydroperoxyalcohols. Evidence exists that organic peroxides exert a stronger bactericidal action than hydrogen peroxide due to a greater tendency to decompose. No evidence is believed to exist in the literature of any microorganism that is resistant to the effects of ozone exposure. The application of ozone is preferable due to its compatibility with biota. There are no residual or harmful reaction products downstream, particularly in the range of 0–20 ppm. The presence of peroxidic compounds could be perceived to be harmful to the biota, but toxicity studies indicate the contrary to be true. Studies have shown that, chemically, these compounds are highly unstable and rapidly decompose. It has also been shown that these compounds can be removed by other oxidizing molecules.

In addition to demonstrating powerful capabilities in the destruction or inactivation of bacteria, fungi and protozoa, ozone has been shown to be virucidal. The efficacy of ozone (a 99% reduction was reported for all of the following values given) has been reported to range from 2.2 mg/l for *Escherichia coli* in 19 minutes from raw waste water; 0.02 mg/l for *Candida tropicalis* in 0.30 minutes from ozone-demand free water; 1.2 mg/l for *Naegleria gruberi* in 1.1 minutes from ozone-demand free phosphate buffer solution and 0.2 mg/l for Poliovirus type I in 9 minutes from activated sludge effluent. With regard to bacterial spores (specifically, *Bacillus subtilis* v.*globigii*), ozone has been shown to achieve a four-log reduction within the range of 1.5 minutes to 2 minutes when water is purged with 3% ozone, by weight. Using a non-toxic concentration of 4 $\mu$g ozone per ml of serum, ozone can achieve a six-log reduction in the infectious titer of human immunodeficiency virus ("HIV").

Ozone can be created by an ozone generator, which subjects air to an electric discharge that is referred to in the art as a corona When air is forced through the corona, oxygen in the air is transformed from $O_2$, the molecule containing two oxygen atoms, which is normally found in the air, into single oxygen-free radicals, Some of these free radicals combine to form ozone. An exemplary corona discharge ozone generator is disclosed in U.S. Pa. No. 5,145,350 to Dawson et al., Sep. 8, 1992 (hereinafter "the '350 Patent"), the disclosure of which is hereby incorporated by this reference in its entirety.

The ozone generator of the '350 Patent includes a drive circuit and a "corona cell", which includes a hollow insulator, a primary helical electrode positioned around the outside of the insulator, and a secondary electrode positioned within the insulator. At least one of the primary and secondary electrodes of the corona cell is spaced apart from the insulator. The drive circuit of the ozone generator includes a waveform generator, which generates a direct current ("DC") voltage. A DC switching device associated with the waveform generator rapidly applies a DC voltage to the primary winding of a transformer that is connected to the corona cell and withdraws the DC voltage from the primary winding.

As the DC voltage is suddenly applied to the primary winding of the transformer, magnetic fields are developed which excite a secondary winding of the transformer and a circuit of the corona cell. Similarly, when the voltage is withdrawn from the primary winding, the magnetic fields collapse, which also excites the secondary winding of the transformer and the corona cell. Unless these oscillations in the voltage of the secondary winding of the transformer and corona cell are sustained or dampened, they will eventually decay. The DC voltage is repeatedly applied to and withdrawn from the primary winding of the transformer to excite the secondary winding of the transformer at a frequency that results in a sufficient potential difference between the primary and secondary electrodes of the corona cell that one or both of the electrodes discharge electricity into the space between at least one of the electrodes and the insulator of the corona cell. As oxygen molecules pass through the space while electricity is being discharged therein, the oxygen molecules ($O_2$) are broken up into oxygen free radicals, some of which combine with oxygen molecules ($O_2$) to form ozone ($O_3$).

The secondary winding of the transformer and the corona cell form a "tank circuit", which has a resonant frequency ($f_o$). The resonant frequency of the tank circuit depends on the inductance of the secondary winding of the transformer and the capacitance of the corona cell, which is dictated, at least in part, by the material and thickness of the insulator. Typically, the frequency with which the DC voltage is applied to the primary winding of the transformer by the waveform generator, commonly referred to as the driving frequency, is approximately equal to the resonant frequency of the tank circuit.

It would be an improvement in the art to produce ozone in increased concentrations while using known corona discharge ozone generators.

DISCLOSURE OF THE INVENTION

The invention includes a method for operating corona discharge ozone generators in a manner that optimizes the concentration of ozone that can be generated thereby. The method of the invention includes determining the resonant frequency of the tank circuit of the corona discharge ozone generator and applying a direct current to a primary winding of a transformer of the ozone generator at a driving frequency equal to about half the tank circuit's resonant frequency.

In another aspect of the method of the present invention, the concentration of ozone created by a corona discharge ozone generator is maximized by selecting a corona cell with a capacitance that produces a resonant frequency equal to about two times a driving frequency applied to a primary winding of a transformer of the ozone generator.

The methods of the present invention may be used to provide an increased concentration of ozone in a variety of applications, including the treatment of liquids and sanitization of foods.

BEST MODE OF THE INVENTION

The present invention includes a method for optimizing the concentration of ozone generated by known corona discharge ozone generators, such as that disclosed in the '350 Patent. Other exemplary ozone generators with which the inventive method may be used and that are known in the art include, but are not limited to, those disclosed in the following U.S. Patents: 1,096,991 to Blanchard, May 19, 1914; 3,836,786 to Lowther, Sep. 17, 1974; 3,891,561 to Lowther, Jun. 24, 1975; 3,899,683 to Lowther, Aug. 12, 1975; 3,903,426 to Lowther, Sep. 2, 1975; 3,954,586 to Lowther, May 4, 1976; 3,984,697 to Lowther, Oct. 5, 1976; 3,996,474 to Lowther, Dec. 7, 1976; 4,013,567 to Emelyanov et al., Mar. 22, 1977; 4,141,686 to Lewis, Feb. 27, 1979; 4,255,663 to Lewis, Mar. 10, 1981; 4,411,756 to Bennett et al., Oct. 25, 1983; 4,504,446 to Kunicki et al., Mar. 12, 1985; 4,780,277 to Tanaka et al., Oct. 25, 1988; 4,917,586 to Jacob, Apr. 17, 1990; 4,954,321 to Jensen, Sep. 4, 1990; 5,004,587 to Tacchi, Apr. 2, 1991; 5,089,098 to Tacchi, Feb. 18, 1992; 5,154,895 to Moon, Oct. 13, 1992; 5,211,919 to Conrad, May 18, 1993; 5,302,343 to Jacob, Apr. 12, 1994; 5,306,471 to Harbert et al., Apr. 26, 1994; and 5,433,927 to Mausgrover et al., Jul. 18, 1995, the disclosures of each of which are hereby incorporated by this reference in their entireties.

Figure 1:
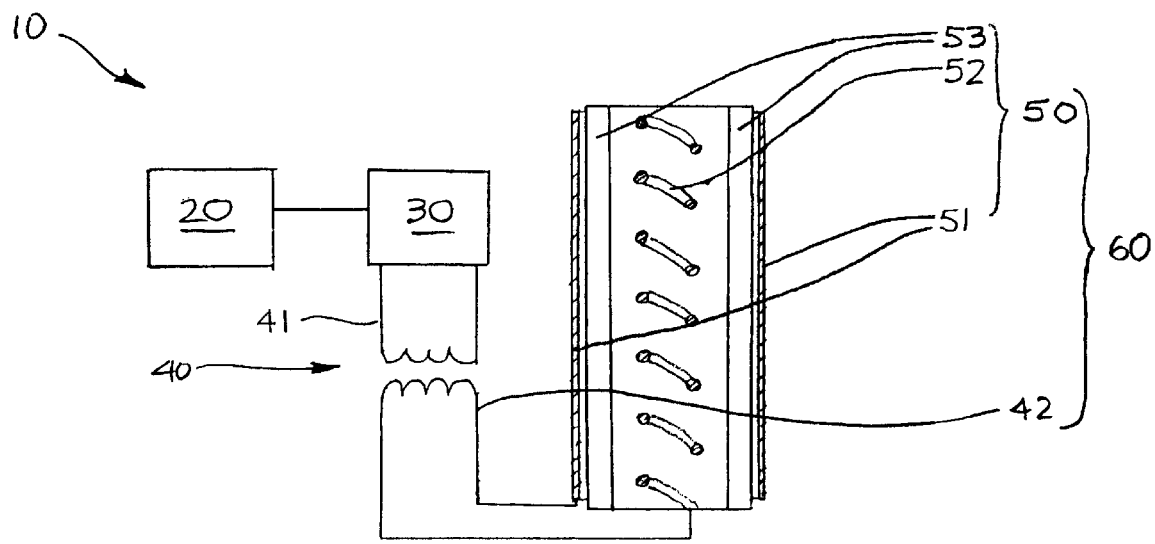
FIG. 1 is a schematic representation of an exemplary corona discharge ozone generator which may be used to carry out the method of the present invention.

FIG. 1 schematically illustrates an exemplary corona discharge ozone generator 10, which includes a DC waveform generator 20 for supplying a DC voltage to the primary winding 41 of a transformer 40, a DC voltage switching device 30 that controls the application of the DC voltage from waveform generator 20 to transformer 40 and the withdrawal of the DC voltage from transformer 40, and a corona cell 50 connected to the secondary winding 42 of transformer 40.

Corona cell 50 includes a primary electrode 51 and a secondary electrode 52 that are connected to secondary winding 42 of transformer 40. Primary electrode 51 is wrapped around the outside of a hollow, dielectric insulator 53. While primary electrode 51 is illustrated as being a screen and secondary electrode 52 is depicted as a helix, ozone generators with primary and secondary electrodes of other configurations may also be used in accordance with teachings of the present invention. Secondary electrode 52 is disposed within insulator 53. At least one of primary electrode 51 and secondary electrode 52 is spaced apart from insulator 53 so as to facilitate the discharge of electrical current therefrom upon achieving a threshold potential difference between primary electrode 51 and secondary electrode 52. Corona cell 50 and secondary winding 42 of transformer 40 are collectively referred to as a tank circuit 60.

As illustrated, insulator 53 has a substantially tubular shape. Known insulators are manufactured from materials such as glass, ceramic, or PYREX™. The capacitance of a corona cell 50 that includes a certain type of insulator 53 material may be determined by known processes. For example, a corona cell with a two inch long by one quarter inch diameter PYREX™ insulator is known to have a capacitance of about 19.4 pF (picoFarads), a corona cell with a two inch long by one quarter inch diameter glass insulator is known to have a capacitance of about 24.7 pF, a corona cell with a three inch long by one quarter inch diameter PYREX™ insulator cell is known to have a capacitance of about 32.5 pF, and a corona cell with a two inch long by one quarter inch diameter glass insulator with a screen core secondary electrode is known to have a capacitance of about 17.8 pF.

Devices that are useful as DC waveform generator 20 and DC voltage switching device 30 are also known in the art. DC waveform generator 20 is electrically connected to DC voltage switching device, which is in turn electrically connected to primary winding 41 of transformer 40.

The amount of DC voltage supplied by DC waveform generator 30, the frequency with which DC voltage switching device 20 applies DC voltage to and withdraws voltage from primary winding 41, and the duty cycle of DC switching device 30, or the relative amounts of time DC current is being supplied to and withdrawn from primary winding 41, are each factors that dictate the potential difference between primary electrode 51 and secondary electrode 52 of corona cell 50. As this potential difference between electrodes 51 and 52 reaches a threshold, each electrode 51, 52 that is spaced apart from insulator 53 discharges electricity. This discharged electricity separates oxygen molecules ($O_2$) flowing between insulator 53 and one or both electrodes 51, 52 into oxygen-free radicals, some of which combine to form ozone ($O_3$).

The driving frequency and duty cycle with which a DC voltage is applied to and withdrawn from primary winding 41 of transformer 40 may have an effect on the oscillation of voltage in secondary winding 42 and tank circuit 60 of which secondary winding 42 is a part. For example, when a DC voltage is applied to or withdrawn from primary winding 41 out of phase with an oscillation in the voltage in tank circuit 60, the applied DC voltage will dampen the oscillations. As another example, when a DC voltage is applied to primary winding 41 at a 50% duty cycle (i.e., application and withdrawal times are about equal) and operating at the same frequency as the resonant frequency of tank circuit 60, the oscillations in the voltage of tank circuit 60 and, thus, in secondary winding 42 will be sustained.

Preferably, in practicing the method of the present invention, the driving frequency is set to about half of the resonant frequency of tank circuit 60 with about a 50% duty cycle. Preferably, the waveform of the DC voltage being supplied to primary winding 41 has a sharp rising and falling edge. These settings for applying and withdrawing a DC voltage to primary winding 41 of transformer 40 will dampen the oscillation in the voltage of secondary winding 42 and, thus, in the voltage of tank circuit 60 at the point where the voltage of tank circuit 60 crosses zero volts. Since the capacitance within tank circuit 60 is small, only a small amount of energy is required to dampen the circuit. The remaining energy is used to re-excite secondary winding 42 and, thus, tank circuit 60 to induce an oscillating voltage therein. Accordingly, these settings should optimize the amount of electricity that is discharged from one or both electrodes 51, 52 of corona cell 50 and, consequently, optimize the concentration of ozone that is generated as oxygen molecules (e.g., in air) flow between insulator 53 and one or both of electrodes 51, 52.

The invention is further explained by the following illustrative examples:

EXAMPLE I

A method for optimizing the ozone production of an ozone generator by applying DC voltage to the primary winding of the transformer thereof at a frequency equal to about half of the resonant frequency of the tank circuit of the ozone generator was tested. A corona discharge ozone generator with a two inch long by one quarter inch diameter PYREX™ corona cell having a capacitance of 19.4 pF, a transformer having a secondary inductance of 6 H (Henrys), and a tank circuit resonant frequency of 14.8 kHz (kiloHertz) was selected for testing. The ozone generator was set up to produce ozone in a confined volume and a known UV ozone monitor was arranged to determine the concentration of ozone produced by the ozone generator. A DC voltage was applied to the primary winding of the transformer of the ozone generator at a driving frequency of about 7.35 kHz and a duty cycle of about 50%, the ozone concentration was measured in parts per million (ppm), and the potential difference, or voltage, between the primary and secondary electrodes of the corona cell was measured.

Figure 2:
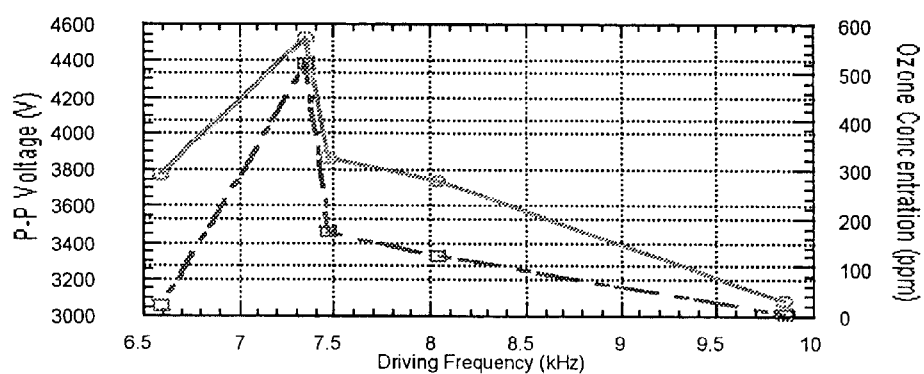
FIG. 2 is a graph illustrating the driving frequency at which ozone production by the corona discharge ozone generator of FIG. 1 is optimized.

For the purpose of comparison, the ozone and potential difference measurements were also taken when a DC voltage was applied to the primary winding of the transformer of the same ozone generator at a duty cycle of about 50% and driving frequencies of about 6.6 kHz, 7.45 kHz, 8.05 kHz, and 8.85 kHz. FIG. 2 illustrates the results of the comparison. The upper, solid line in FIG. 2 represents the potential difference between the two electrodes of the corona cell (left y-ordinate) at different driving frequencies (x-ordinate). The lower, dot-dashed line represents the amount of ozone produced (right y-ordinate) at different driving frequencies (x-ordinate). The results, which are plotted in the graph of FIG. 2, indicate that the potential difference between the two electrodes of the corona cell of the ozone generator is significantly higher at a driving frequency of about 7.35 kHz, or at about half the 14.8 kHz resonant frequency of the tank circuit, than at other driving frequencies. Accordingly, as is also shown in FIG. 2, the ozone production of the corona discharge ozone generator at 7.35 kHz is significantly higher than the concentration of ozone produced at other driving frequencies. Also, the concentration of ozone produced diminishes significantly as the driving frequency increases from about half the resonant frequency of the tank circuit toward the resonant frequency of the tank circuit.

EXAMPLE II

A method was tested for optimizing the ozone production of a corona discharge ozone generator by selecting an ozone generator with a corona cell that produces a tank circuit resonant frequency of about twice the driving frequency with which a DC voltage is to be applied to the primary electrode of the corona cell of the ozone generator. Corona discharge ozone generators with different types of corona cells were tested by applying DC voltage at a driving frequency of about 7.35 kHz to the primary windings of the transformers of the tested ozone generators at about a 50% duty cycle. The tested ozone generators included the following types of corona cells: a two inch long by one quarter inch diameter PYREX™ insulator with a capacitance of about 19.4 pF (picoFarads), a two inch long by one quarter inch diameter glass insulator with a capacitance of about 24.7 pF, a three inch long by one quarter inch diameter PYREX™ insulator with a capacitance of about 32.5 pF, and a corona cell with a capacitance of about 17.8 pF, including a two inch long by one quarter inch diameter glass insulator and a screen core secondary electrode. The resonant frequencies of the tank circuits of each of ozone generators including each of these corona cells and a secondary inductance of 6 H were about 14,752, 13,074, 11,397, and 15,400 Hz, respectively.

The concentrations of ozone produced by the different ozone generators were measured by a UV ozone monitor of a known type, then normalized by dividing the measured concentrations of ozone produced by each ozone generator by the largest measured concentration of ozone produced by any of the tested ozone generators. The results of the test are illustrated in the following TABLE:

TABLE

| Corona Cell | C (pF) | L (H) | $f_o$ (Hz) | $f_o/2$ (Hz) | Normalized Ozone Production |
|---|---|---|---|---|---|
| 2" PYREX ™ | 19.4 | 6 | 14,752 | 7,376 | 1.0 |
| 2" Glass | 24.7 | 6 | 13,074 | 6,537 | 0.8 |
| 3" PYREX ™ | 32.5 | 6 | 11,397 | 5,699 | 0.4 |
| 2" Screen Core | 17.8 | 6 | 15,400 | 7,700 | 0.2 |

Again, from these data, it can be seen that when an ozone generator is selected to have an insulator with a resonant frequency (in this case, about 14.7 kHz for the corona cell with the 2 inch PYREX™ insulator) of about twice the desired driving frequency (in this case about 7.35 kHz), ozone generation will be optimized. These data also show that when the driving frequency (in this case about 7.35 kHz) applied to the primary winding of the transformer of the tested ozone generators is about half the resonant frequency of the insulator of a corona cell of an ozone generator (in this case, about 14.7 kHz for the corona cell with the 2 inch PYREX™ insulator), the amount of ozone produced by the ozone generator is optimized.

In addition, as the resonant frequency of the tank circuit of an ozone generator is determined, at least in part, by the capacitance of the insulator, which is, in turn, dictated by the material and thickness of the insulator, each of these factors may be considered in effecting the optimization and ozone generation methods of the present invention. Moreover, since the inductance of the secondary winding of the transformer, in part, determines the resonant frequency of the tank circuit of an ozone generator, the inductance may also be considered in effecting the optimization and ozone generation methods of the present invention.

Although ozone generators with single corona cells were tested in the EXAMPLES, the disclosed relationships between the driving frequency and the resonant frequency and between the corona cell capacitance and the driving frequency also apply to corona discharge ozone generators that include more than one corona cell, either in parallel or in series.

The present invention also includes ozone generators that operate in accordance with principles of the present invention.

References herein to specific Examples or to specific embodiments should not be interpreted as limitations to the invention's scope which is determined by the claims.

What is claimed is:

1. A method for optimizing a concentration of ozone produced by a corona discharge ozone generator, comprising:
   determining a resonant frequency of a tank circuit of the ozone generator; and
   applying a DC voltage to a primary transformer winding of the ozone generator at a driving frequency of about half said resonant frequency.

2. The method according to claim 1, wherein said applying further comprises applying said DC voltage at about a 50% duty cycle.

3. The method according to claim 1, wherein said driving frequency and said resonant frequency are substantially in phase.

4. The method according to claim 1, further comprising permitting oxygen molecules to flow between a primary electrode and a secondary electrode of the ozone generator.

5. The method according to claim 1, wherein said determining said resonant frequency comprises selecting a corona cell with a capacitance configured to at least partially impart a resonant frequency to said tank circuit of about twice said driving frequency.

6. A method for optimizing a concentration of ozone produced by a corona discharge ozone generator, comprising:
   selecting a driving frequency at which a DC voltage is to be applied to a primary transformer winding of the ozone generator; and
   selecting a corona cell with a capacitance configured to produce a resonant frequency of a tank circuit of the ozone generator of about twice said driving frequency.

7. The method according to claim 6, wherein said selecting said corona cell further includes considering a secondary inductance of a transformer of the ozone generator.

8. The method according to claim 6, wherein said selecting said driving frequency comprises selecting said driving frequency to equal about 7.35 kHz.

9. The method according to claim 8, wherein said selecting said corona cell comprises selecting said corona cell to have a capacitance of about 19.4 pF.

10. The method according to claim 9, wherein a transformer of the ozone generator has a secondary inductance of about 6 H.

11. The method according to claim 6, further comprising applying said DC voltage to said primary transformer winding at said driving frequency.

12. The method according to claim 11, wherein said applying includes applying said DC voltage at about a 50% duty cycle.

13. The method according to claim 11, wherein said applying said DC voltage at said driving frequency is conducted substantially in phase with said resonant frequency.

14. The method according to claim 11, further comprising introducing oxygen molecules between a primary electrode and a secondary electrode of the ozone generator.

15. An ozone generator, comprising:
   a corona cell including:
      a hollow insulator;
      a primary electrode surrounding said hollow insulator; and
      a secondary electrode disposed within said hollow insulator, substantially opposite said primary electrode, said secondary electrode and said hollow insulator, at least one of said primary and secondary electrodes being spaced apart from said hollow insulator,
   a transformer comprising a primary winding and a secondary winding, said secondary winding and said corona cell comprising a tank circuit having a resonant frequency;
   a DC waveform generator electrically connected to said primary winding; and
   a DC switching device disposed electrically between said DC waveform generator and said primary winding, said DC switching device configured to supply DC voltage from said DC waveform generator to said primary winding at a driving frequency of about half said resonant frequency.

16. The ozone generator of claim 15, wherein said DC switching device is configured to supply DC voltage from said DC waveform generator to said primary winding at a duty cycle of about 50%.

17. A corona discharge ozone generator, the ozone generator comprising:
   a transformer;
   a corona cell including a primary electrode disposed around an insulator thereof and a secondary electrode within the insulator, substantially opposite said primary electrode, at least one of said primary and secondary electrodes being spaced apart from said insulator, said corona cell and a secondary winding of said transformer comprising a tank circuit having a resonant frequency;
   a DC waveform generator electrically connected to a primary winding of said transformer, and
   a DC switching device disposed electrically between said DC waveform generator and said primary winding: and configured to apply a DC voltage from said DC waveform generator and to withdraw DC voltage therefrom at a driving frequency, said DC switching device configured to operate at a driving frequency of about half said resonant frequency of said tank circuit.

18. The corona discharge ozone generator of claim 17, wherein said DC switching device is operated at a duty cycle of about 50%.

19. The corona discharge ozone generator of claim 17, wherein said DC switching device is operated so that said driving frequency is substantially in phase with said resonant frequency.

* * * * *